(12) United States Patent
Ballantine et al.

(10) Patent No.: US 8,420,256 B2
(45) Date of Patent: Apr. 16, 2013

(54) CONTROLLING LEAKAGE IN AN ELECTROCHEMICAL CELL

(75) Inventors: Arne W. Ballantine, Menlo Park, CA (US); David Kirchhoff, Porter Corners, NY (US); Michael P. Gordon, Troy, NY (US); Lisa Gordon, legal representative, Anaheim, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1255 days.

(21) Appl. No.: 11/656,839

(22) Filed: Jan. 23, 2007

(65) Prior Publication Data

US 2008/0176136 A1   Jul. 24, 2008

(51) Int. Cl.
*H01M 2/08*   (2006.01)
*H01M 6/00*   (2006.01)

(52) U.S. Cl.
USPC .......................................... 429/185; 29/623.2

(58) Field of Classification Search ........................ None
See application file for complete search history.

(56) References Cited

U.S. PATENT DOCUMENTS 7,659,022 B2 *   2/2010   Valensa et al. ................. 429/411
7,776,490 B2      8/2010   Sugiura et al.

* cited by examiner

*Primary Examiner* — Milton I Cano
*Assistant Examiner* — Sarah A Slifka
(74) *Attorney, Agent, or Firm* — Nelson Mullins Riley & Scarborough LLP; Anthony A. Laurentano

(57) ABSTRACT

An electrochemical cell includes a flow plate and a seal that is contact with the flow plate. The seal forms an outer boundary of a sealed region to contain a reactant flow. The flow plate includes an opening that is located out of the sealed region to communicate leakage from the sealed region to an exhaust flow of the cell.

7 Claims, 8 Drawing Sheets

CONTROLLING LEAKAGE IN AN ELECTROCHEMICAL CELL

BACKGROUND

The invention generally relates to controlling leakage in an electrochemical cell, such as a hydrogen pump cell or a fuel cell, as examples.

A fuel cell is an electrochemical device that converts chemical energy directly into electrical energy. For example, one type of fuel cell includes a proton exchange membrane (PEM) that permits only protons to pass between an anode and a cathode of the fuel cell. Typically PEM fuel cells employ sulfonic-acid-based ionomers, such as Nafion, and operate in the 50° Celsius (C) to 75° C. temperature range. Another type employs a phosphoric-acid-based polybenziamidazole, PBI, membrane that operates in the 150° to 200° temperature range. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

Anode: $H_2 \rightarrow 2H^+ + 2e^-$            Equation 1

Cathode: $O_2 + 4H^+ + 4e^- \rightarrow 2H_2O$            Equation 2

The PEM fuel cell is only one type of fuel cell. Other types of fuel cells include direct methanol, alkaline, phosphoric acid, molten carbonate and solid oxide fuel cells.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one cell of the stack. The plates may include various surface flow channels and orifices to, as examples, route the reactants and products through the fuel cell stack. Electrically conductive gas diffusion layers (GDLs) may be located on each side of a catalyzed PEM to form the anode and cathodes of each fuel cell. In this manner, reactant gases from both the anode and cathode flow-fields may diffuse through the GDLs to reach the catalyst layers.

In general, a fuel cell is an electrochemical cell that operates in a forward mode to produce power. However, the electrochemical cell may be operated in a reverse mode in which the cell produces hydrogen and oxygen from electricity and water. More specifically, an electrolyzer splits water into hydrogen and oxygen with the following reactions occurring at the anode and cathode, respectively:

Anode: $2H_2O \rightarrow O_2 + 4H^+ + 4e^-$            Equation 3

Cathode: $4H^+ + 4e^- \rightarrow 2H_2$            Equation 4

An electrochemical cell may also be operated as an electrochemical pump. For example, the electrochemical cell may be operated as a hydrogen pump, a device that produces a relatively pure hydrogen flow at a cathode exhaust of the cell relative to an incoming reformate flow that is received at an anode inlet of the cell. In general, when operated as an electrochemical pump, the cell has the same overall topology of the fuel cell. In this regard, similar to a fuel cell an electrochemical cell that operates as a hydrogen pump may contain a PEM, gas diffusion layers (GDLs) and flow plates that establish plenum passageways and flow fields for communicating reactants to the cell. However, unlike the arrangement for the fuel cell, the electrochemical pump cell receives an applied voltage, and in response to the received current, hydrogen migrates from the anode chamber of the cell to the cathode chamber of the cell to produce hydrogen gas in the cathode chamber. A hydrogen pump may contain several such cells that are arranged in a stack.

The operation of an electrochemical cell typically is more efficient when its reactant flows are pressurized. In general, higher pressures translate to higher efficiencies. However, higher pressure fuel cell systems inherently have a greater potential for leaks. Thus, as the reactant pressures increase, so does the leakage rate. In general, the leakages may pose environment and safety challenges.

Thus, there is a continuing need for better ways to control the leakage in an electrochemical cell.

SUMMARY

In an embodiment of the invention, an electrochemical cell includes a flow plate and a seal that is contact with the flow plate. The seal forms an outer boundary of a sealed region to contain a reactant flow. The flow plate includes an opening that is located out of the sealed region to communicate leakage from the sealed region to an exhaust flow of the cell.

In another embodiment of the invention, a technique that is usable with an electrochemical cell includes forming a sealed region on a flow plate to contain a reactant flow of the cell and forming an opening in the flow plate out of the sealed region. The technique includes communicating leakage from the sealed region through the opening to an exhaust flow of the cell.

Advantages and other features of the invention will become apparent from the following drawing, description and claims.

DETAILED DESCRIPTION

Figure 1:
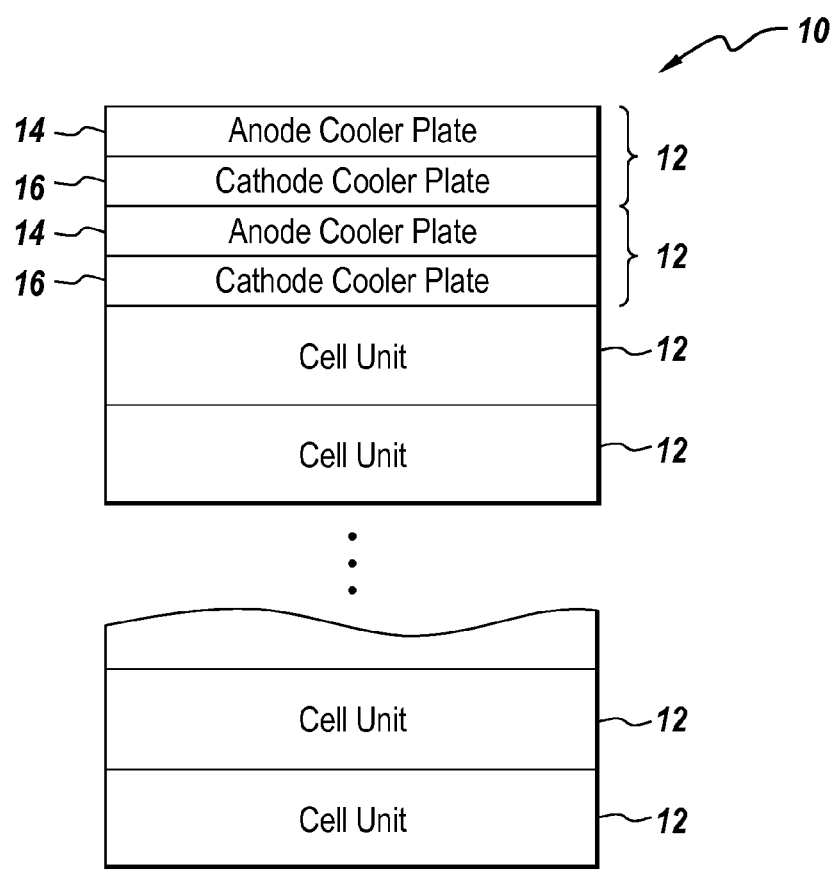
FIG. 1 is a schematic diagram of an electrochemical cell stack according to an embodiment of the invention.

FIG. 1 depicts an electrochemical cell stack 10 in accordance with some embodiments of the invention. The electrochemical cell stack 10 may be used to form a fuel cell stack that produces electrical power, an electrolyzer or an electrochemical pump (a hydrogen pump, for example), depending on the particular embodiment of the invention. Regardless of the configuration of the electrochemical cell stack 10, the stack 10 generally contains electrochemical cells, each of which is formed from a repeating cell unit 12.

As an example, each cell unit 12 may be a two plate design that includes an anode cooler plate 14 and a cathode cooler plate 16. When used as a fuel cell stack, the anode cooler plate 14 has a bottom surface that contains flow channels for purposes of communicating fuel to a membrane electrode assembly (MEA) of a particular fuel cell. An oxidant flow is communicated to the other side of the MEA through flow channels that are formed in an upper surface of the adjacent cathode cooler plate 16. The bottom surface of the cathode cooler plate 16 and the upper surface of the anode cooler plate 14 contain coolant flow channels for purposes of circulating a coolant through the stack 10.

It is noted that the above description is for purposes of example only, as electrochemical cells may be formed from other designs, such as a three flow plate design, for example, in accordance with some embodiments of the invention. Furthermore, as another example, coolant channels may be spaced farther apart in the stack 10. Thus, many variations are possible and are within the scope of the appended claims.

Figure 2:
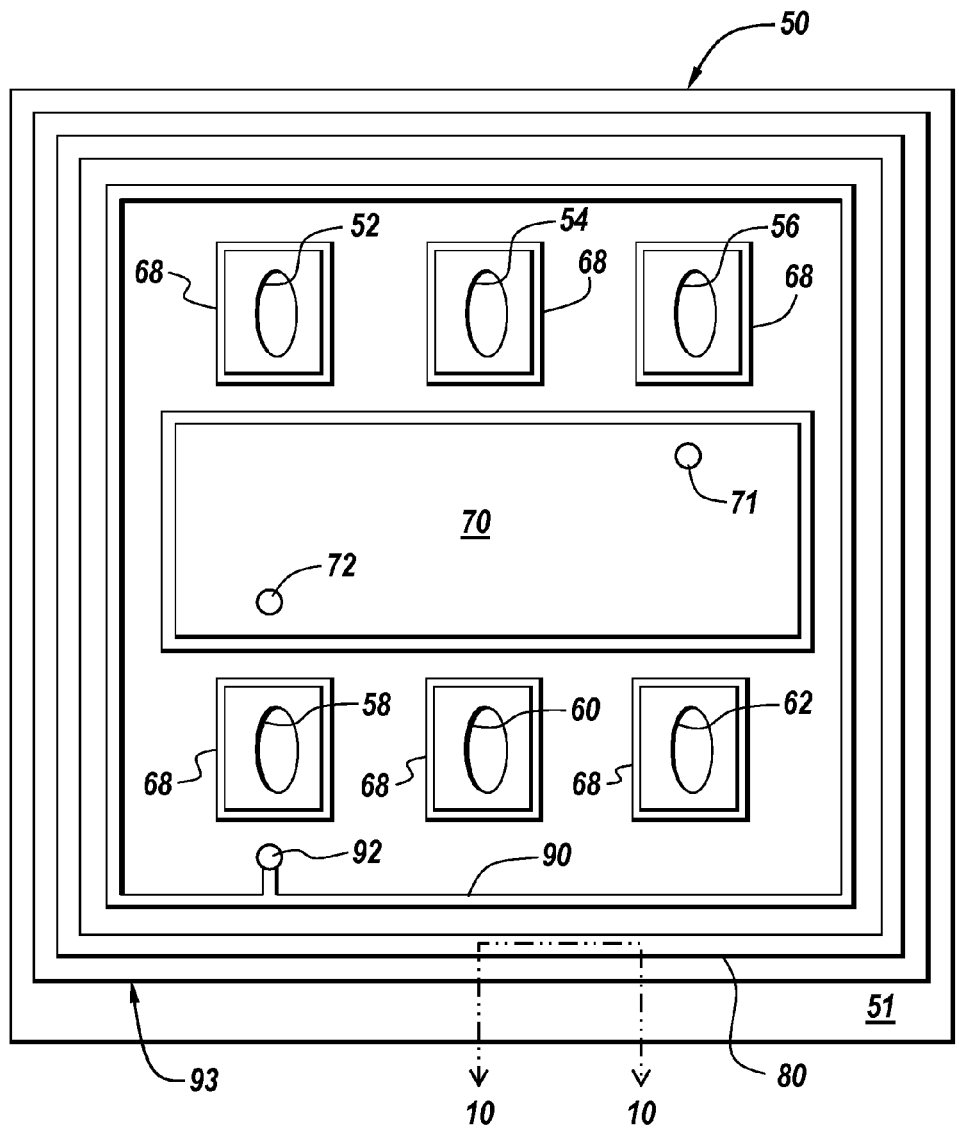
FIG. 2 is a view of a reactant side of a flow plate of the electrochemical cell stack according to an embodiment of the invention.

FIG. 2 depicts a side, or surface 51, of an exemplary flow plate 50. It is assumed for purposes of simplifying the discussion herein that the flow plate 50 is used for purposes of forming a fuel cell, although the flow plate 50 may also be used for other purposes, such as forming an electrochemical pump cell or an electrolyzer cell, depending on the particular embodiment of the invention. The surface 51 is associated with a reactant flow, such as an oxidant flow or a fuel flow (hydrogen flow, for example). As a more specific example, for the case in which the flow plate 50 forms part of the electrochemical cell stack 10 (see FIG. 1), the surface 51 may be the lower surface of the anode cooler plate 14 (and thus, be associated with a fuel flow); or, alternatively, the surface 51 may be the upper surface of the cathode cooler plate 16 (and thus, may be associated with an oxidant flow).

Referring to FIG. 2, the flow plate 50 includes an active area 70 that has flow channels (serpentine flow channels, for example, which are not shown) to communicate the reactant flow to an MEA (not shown) that resides next to the active area 70 between the flow plate 50 and the adjacent flow plate.

Inside the fuel cell stack, the reactant and coolant flows are routed between inlet and outlet plenum passageways of the stack. The input and output plenums are formed from openings of the flow plates of the stack.

For example, FIG. 2 depicts openings 52, 54 and 56 that form respective portions of the inlet plenum passageways of the stack. As a more specific example, the opening 52 may form part of the oxidant inlet plenum passageway; the opening 54 may form part of the coolant inlet plenum passageway, and the opening 56 may form part of the fuel inlet plenum passageway. FIG. 2 also depicts openings 58, 60 and 62 that may be associated with the outlet plenum passageways of the stack. In this regard, the opening 58 may form part of the fuel outlet plenum passageway; the opening 60 may form part of the coolant outlet plenum passageway; and the opening 62 may form part of the oxidant outlet plenum passageway.

It is assumed for purposes of the example that is depicted in FIG. 2 that the surface 51 is associated with a fuel flow, a fuel flow that is routed from the fuel inlet plenum passageway of the stack, through the active area 70 and into the fuel outlet plenum passageway. More specifically, an incoming fuel flow enters the active area 70 through an opening 71 (called a "dive-through") that is in communication with the opening 56. The incoming fuel flows through the flow channels of the active area 70 and exits the active area 70 through another opening 72, or dive-through, to enter the fuel outlet plenum passageway, which is in communication with the opening 58. The openings 71 and 72 are sized to work in conjunction with the incoming fuel flow to build up a relatively high pressure in the fuel inlet plenum passageway and in the active area 70. For example, this pressure may be in the range of 600 to 10,000 pounds per square inch (psi), depending on the particular embodiment of the invention. It is noted that other pressures may be used in accordance with other embodiments of the invention.

With the relatively high pressure in the active region 70 and inlet plenum passageway, it is possible that leakage may occur around seals that isolate the high pressure fuel flow from the remaining regions of the flow plate 50. For example, as depicted in FIG. 2, the flow plate 50 includes a seal 68 that generally surrounds the opening 56 and a seal 74 that generally surrounds the active area 70. The seals 68 and 74 are primary seals that are designed to define outer boundaries so that the reactant flow is contained within. However, under relatively high pressure, leakage may occur, and thus, fuel may escape outside of the primary seals 68 and 74. It is noted that the primary seals 68 and 74, as well as other seals that are described herein, may be planar gasket-type seals, in accordance with some embodiments of the invention, although other seals are possible and are within the scope of the appended claims.

An outer secondary seal 80 is located on the flow plate 50 surrounds the primary seals 68 and 74 for purposes of forming a backup seal for the primary seals 68 and 74. By itself, however, the secondary seal 80 may be insufficient in that if not for the features that are described herein, pressure may build up from accumulated leakage from the primary seals 68 and 74 to eventually cause leakage from the secondary seal 80. However, such a pressure buildup does not occur because the flow plate 50 includes at least one opening 92, or dive-through, that is located inside the region sealed by the secondary seal 80 and outside of the regions sealed by the primary seals 68 and 74. The opening 92 extends through the flow plate 50 from the upper reactant surface 51 to the lower surface 52, which is depicted in FIG. 3.

Figure 3:
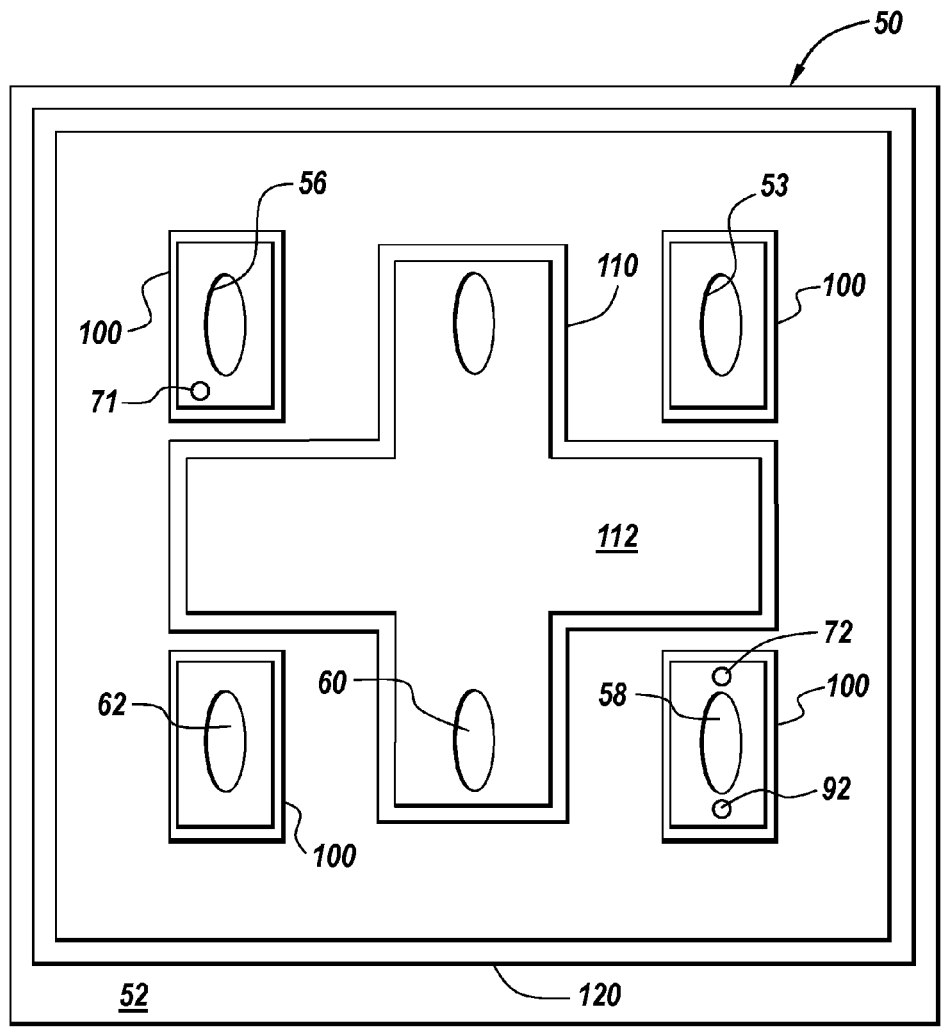
FIG. 3 is a view of the opposite coolant side of the flow plate of FIG. 2 according to an embodiment of the invention.

Referring to FIG. 3 in conjunction with FIG. 2, the opening 92 is in fluid communication with the opening 58. More specifically, as shown in FIG. 3, a seal 100 extends around the periphery of the opening 58 and the opening 92. Therefore, any fuel leakage flows from the upper surface 51 through the opening 92 and into the opening 58 via the seal provided by the seal 100. As a result, any leakage is communicated into the anode exhaust stream. Thus, leakage is contained internally within the stack, pressure on the second seal 80 is minimized and any leakage is routed to the stack's anode exhaust flow.

Referring back to FIG. 2, in accordance with some embodiments of the invention, for purposes of enhancing the communication of leakage to the opening 92, a leakage channel 90 is formed in the upper surface 51 of the flow plate 50. As depicted in FIG. 2, in accordance with some embodiments of the invention, the channel 90 is located inside the region defined by the secondary seal 80 and circumscribes the region that includes the primary seals 68 and 74. Therefore, any fuel leakage from the primary seals 68 and 74 flows into the channel 90 and is routed (due to the relative low pressure present at the opening 92) to the opening 92.

Figure 10:
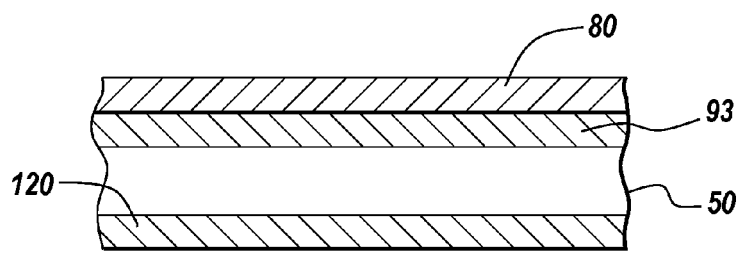
FIG. 10 is a cross-sectional view taken along line 10-10 of FIG. 2 according to an embodiment of the invention.

Referring to FIG. 10 in conjunction with FIG. 2, for purposes of preventing any leakage from being communicated to the reactant flow of the adjacent flow plate, in accordance with some embodiments of the invention, a layer 93 (depicted as being transparent for purposes of simplification) extends from the active area 70 and outside of the secondary seal 80 near the perimeter of the flow plate 50. As examples, the layer 93 may be formed from an extension of the membrane of the MEA that extends to the edges of the flow plate 50, in accordance with some embodiments of the invention. In other embodiments of the invention, the layer 93 may be a separate layer that is formed from a plastic border, such as kynar, which extends to the edges of the flow plate 50. The layer 93 extends beneath the primary seal 80 to seal any leakage inside the seal 80. In some applications, the seal that is formed by the layer 93 may be unnecessary, and for these embodiments of the invention, the layer 93 is not included in the stack.

Among the other features depicted in FIG. 2, in accordance with some embodiments of the invention, primary seals 68 may be formed around the other plate openings 52, 54, 60 and 62.

Referring to FIG. 3, similar seals 100 may be formed around the openings 53, 56, 58 and 62. Furthermore, another seal 110 surrounds the coolant openings 54 and 60 and a coolant flow area 112. As also shown in FIG. 3, the seal 100 around the opening 56 extends around the opening 71 (see also FIG. 2) in the active area 70. Thus, incoming fuel flow is routed through the opening 56 into the opening 71 and to the active region 70. As also shown in FIG. 3, the exit opening 72 of the active region 70 is surrounded by the seal 100 that also surrounds the opening 58. Thus, the fuel flow from the active area 70 flows through the opening 72 and into the opening 58 to enter the fuel exhaust flow. As also shown in FIG. 3, the opening 92 is also contained within the same seal 100 for purposes of routing any leakage into the fuel exhaust flow.

Figure 4:
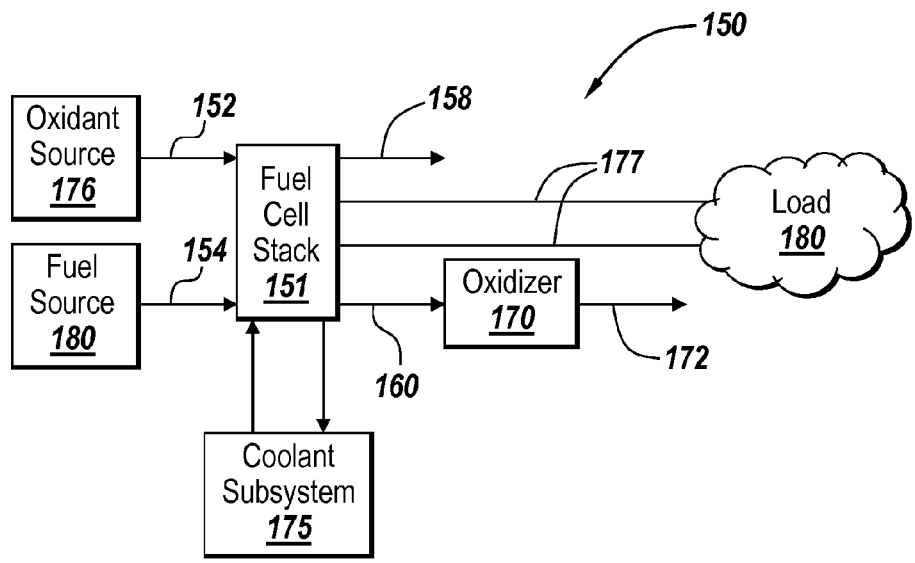
FIG. 4 is a schematic diagram of a fuel cell system according to an embodiment of the invention.

The above-described flow plates and seals may be used to form an electrochemical cell stack, such as an exemplary power producing fuel cell stack 151 that is depicted in FIG. 4. Referring to FIG. 4, the fuel cell stack 151 is part of a fuel cell system 150. The fuel cell stack 151 includes an oxidant inlet 152 that receives an incoming oxidant flow from an oxidant source 76. The incoming oxidant flow flows through the cathode chamber of the fuel cell stack 151 and to an oxidant exhaust 158. In the context of this application, the "cathode chamber" refers to the oxidant inlet and outlet plenum passageways as well as the oxidant flow plate channels of the fuel cell stack 16. The oxidant exhaust may be routed to an oxidizer, may be routed to a reformer, may be routed back to an anode inlet 154 (described below), etc., depending on the particular embodiment of the invention.

The fuel cell stack 151 also includes an anode inlet 154 that receives an incoming fuel flow from a fuel source 180. In accordance with some embodiments of the invention, the fuel source 180 may include a reformer with a compressor; may be a pressurized hydrogen tank; etc., depending on the particular embodiment of the invention. The incoming fuel flow is communicated through the anode chamber of the fuel cell stack 151 and exits the stack 10 at an anode exhaust outlet 160. In the context of this application, the "anode chamber" refers to the fuel inlet and outlet plenum passageways as well as the anode flow channels of the fuel cell stack 151.

As depicted in FIG. 4, in accordance with some embodiments of the invention, the anode exhaust may be routed through an oxidizer 170 that produces an output flow and an outlet 172 of the oxidizer 170. As also shown in FIG. 4, the fuel cell stack 151 may be coupled to a coolant subsystem 175 that circulates a coolant through the stack 151 for purposes of regulating its temperature. Thus, as shown in FIG. 4, the fuel cell stack 151 may be used to produce electrical power (delivered at output terminals 177) to an electrical load 180.

Figure 5:
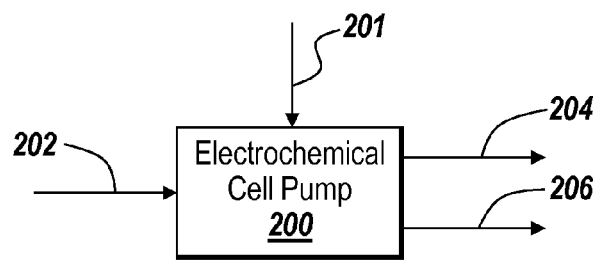
FIG. 5 is a schematic diagram of an electrochemical cell pump according to an embodiment of the invention.

The above-described leakage control may be applied to other types of electrochemical cells, other than fuel cells that produce electricity. More specifically, referring to FIG. 5, in accordance with some embodiments of the invention, the above-described leakage control may be applied to an electrochemical cell pump 200. The electrochemical pump 200 may be formed from a stack of electrochemical cells, similar to a fuel cell stack that produces electricity. However, unlike the fuel cell stack, the electrochemical pump 200 receives an applied voltage current (across its stack terminals 201) and produces a significantly pure fuel flow at its cathode chamber outlet 206 in response to an incoming reformate flow at its anode inlet 202.

Similar to the flow plates described above, the stack that forms the electrochemical pump 200 may use dive-through openings in its flow plates for purposes of controlling the leakage from the cathode chamber, the chamber that contains the relatively pure fuel flow. This leakage may, depending on the particular embodiment of the invention, either be directed to the anode exhaust or the cathode exhaust of the electrochemical pump 200.

Figure 6:
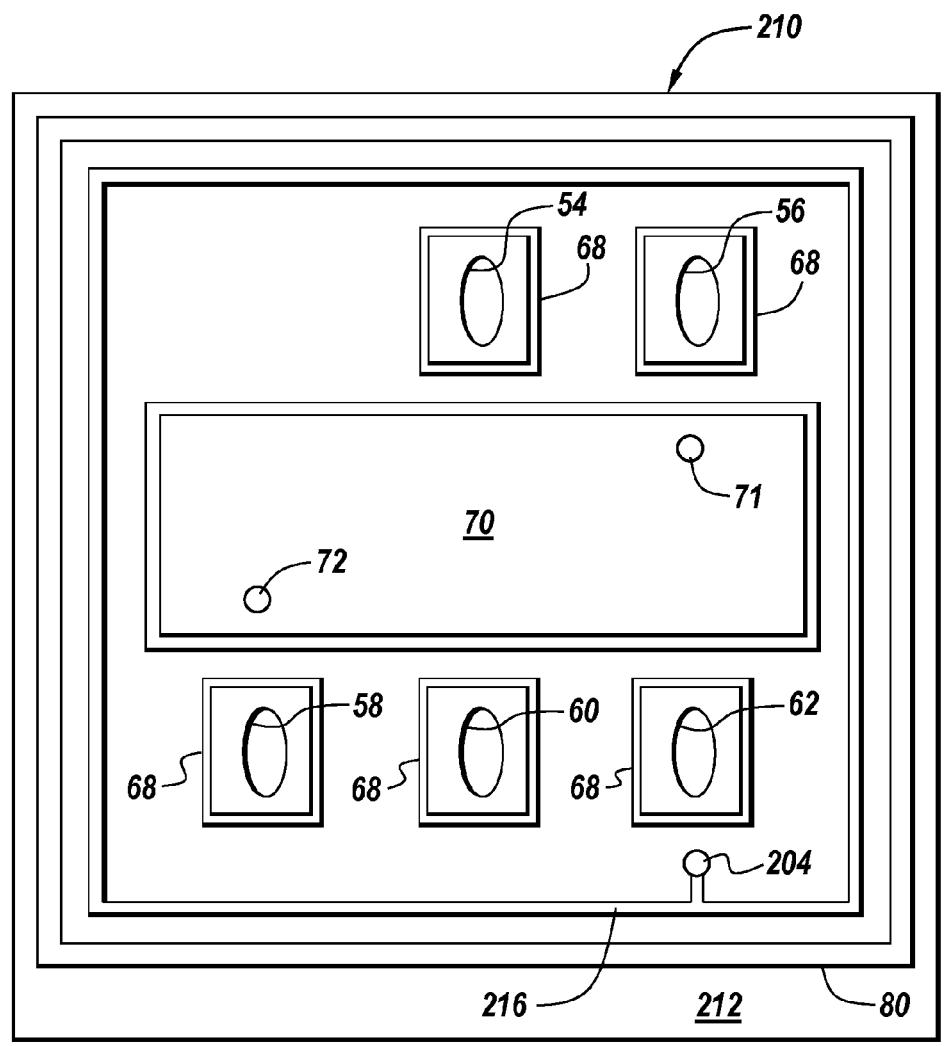
FIGS. 6 and 8 are views of reactant sides of flow plates of electrochemical pumps according to different embodiments of the invention.

More specifically, FIG. 6 depicts a side, or surface 212 of an exemplary flow plate 210 of the electrochemical cell pump 200 according to an embodiment of the invention. The flow plate 210 may generally have the same design as the flow plate 50 (see FIG. 2), with like reference numerals being used. However, the flow plates 50 and 210 differ in the following manner. In particular, because the electrochemical cell pump 200 does not have a cathode inlet passageway in its input plenum, the flow plate 210 does not include the opening 52 or the associated seal 68. As depicted in FIG. 6, instead of having an opening 92 that opens into the anode exhaust flow, the flow plate 210 has an opening 204 to remove leakage that might occur from the cathode chamber. Thus, any leakage outside the primary seal 74 or the seal 68 that surrounds the opening 62 is routed to the opening 204, an opening that is in communication with the cathode exhaust. As depicted in FIG. 6, the flow plate 210 may also include a groove 216 that extends around the seals 68 and 74 and inside the for purposes of routing leakage to the opening 204.

Figure 7:
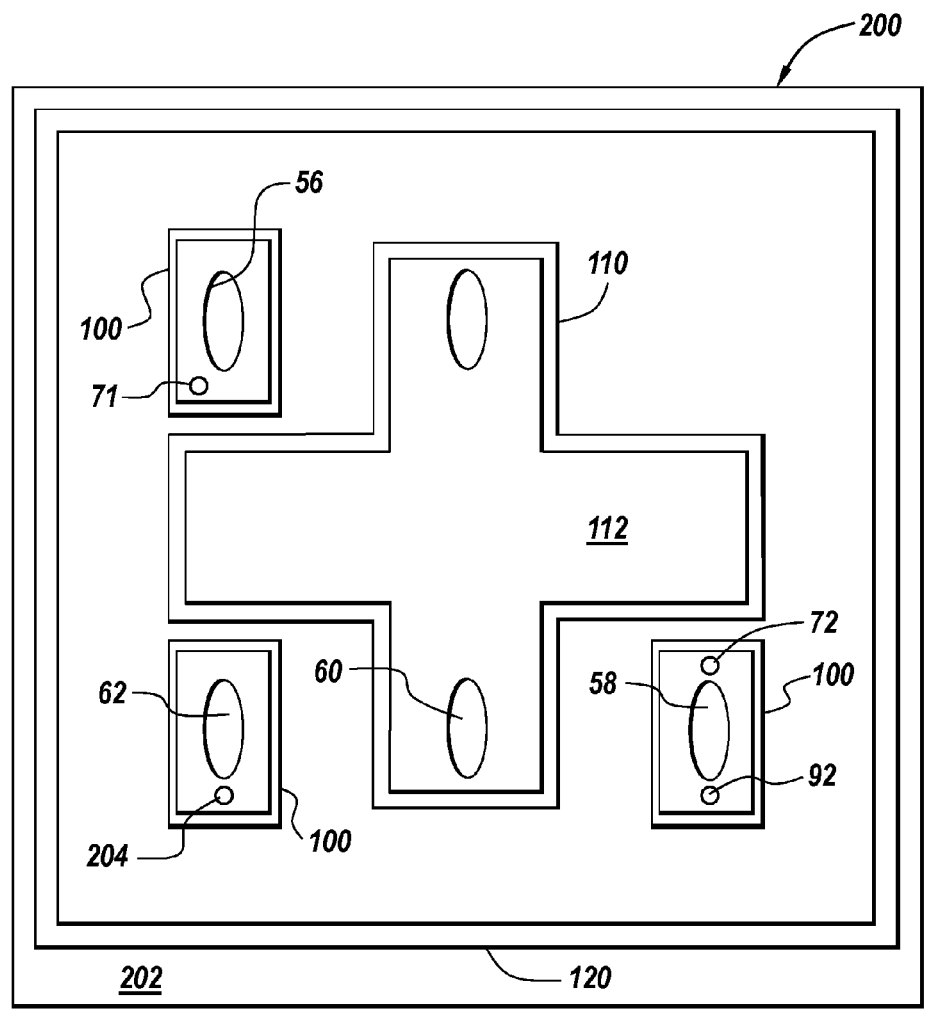
FIGS. 7 and 9 are views of coolant sides of flow plates of electrochemical pumps according to different embodiments of the invention.

Referring also to FIG. 7 which shows the opposite side of the flow plate 200, the opening 204 is located inside a seal 100 that surrounds the cathode exhaust opening 62. Thus, all leakage flow occurs to the cathode exhaust.

Figure 8:
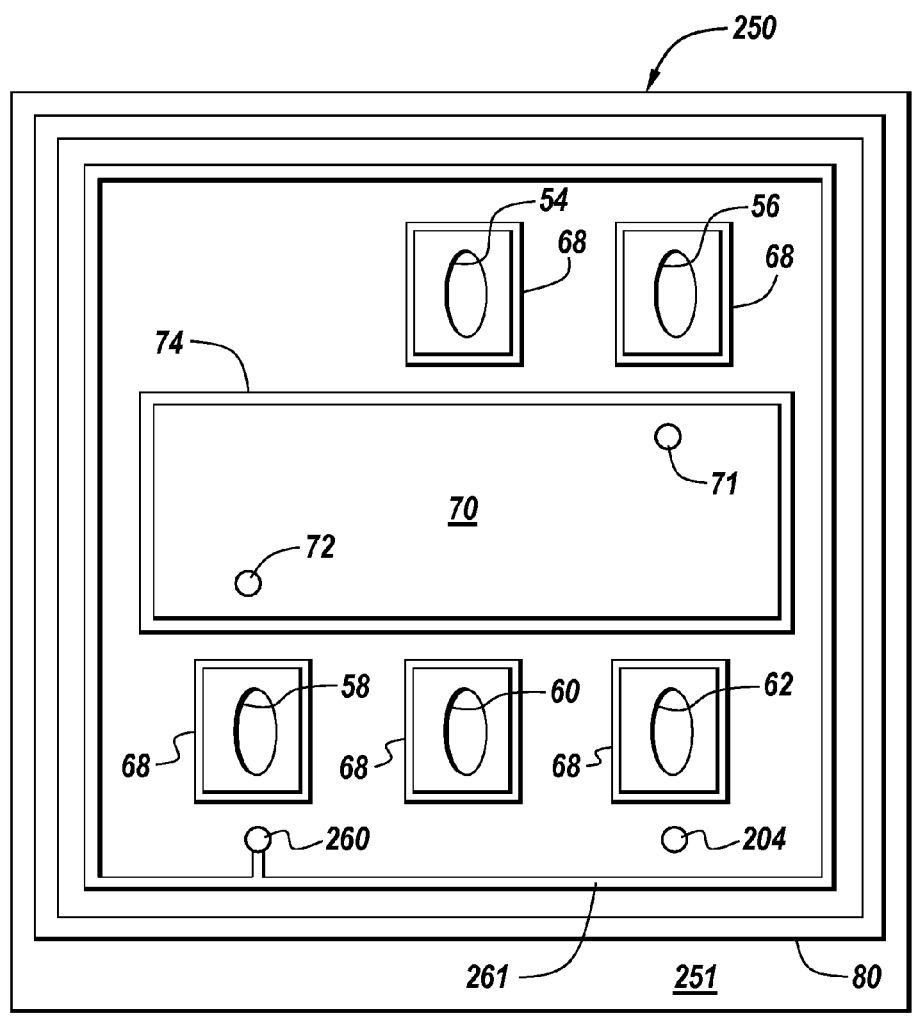
Figure 9:
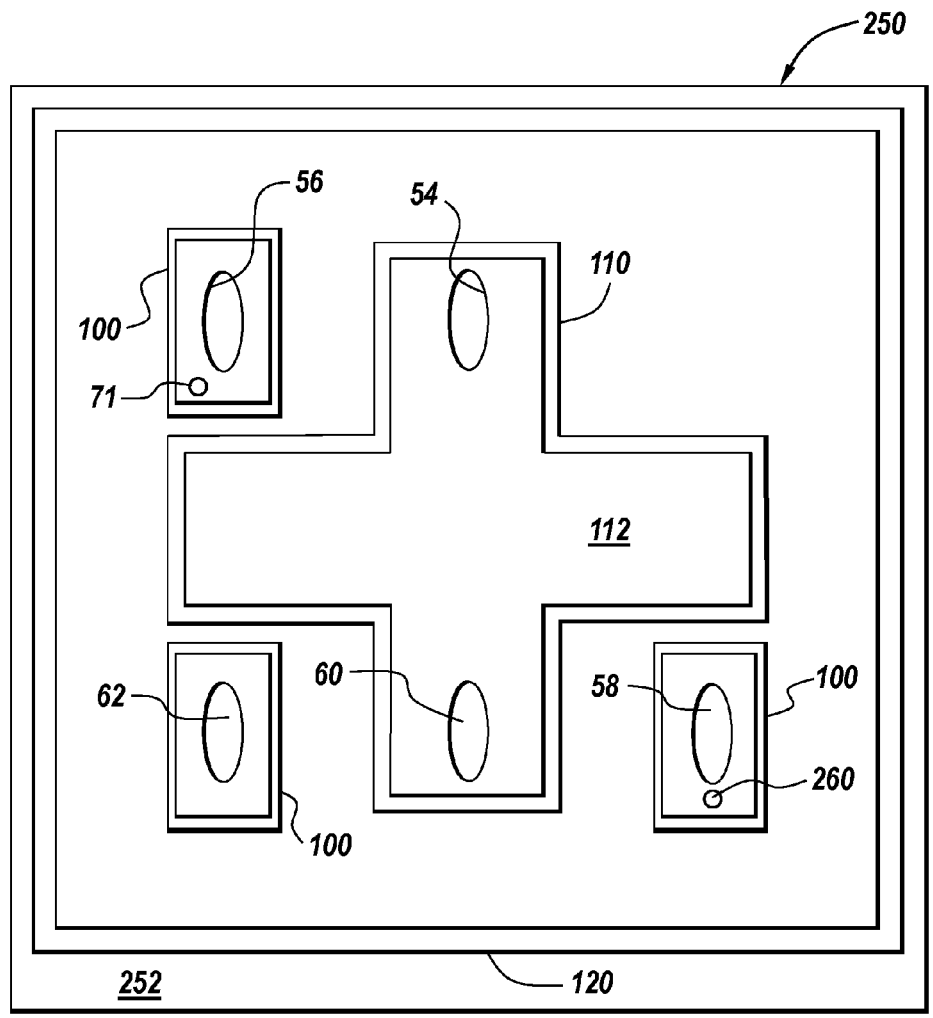

Referring to FIG. 8, alternatively, in accordance with some embodiments of the invention, leakage from the cathode chamber may be routed to the anode exhaust. In this regard, a flow plate 250 has a similar design to the flow plate 210 (see FIG. 6) with like reference numerals being used, except that the flow plate 250 includes an opening 260 (that replaces the opening 204) that communicates leakage from the cathode chamber into the anode exhaust. More particularly, the opening 260 is in communication with the anode exhaust opening 58. A channel 261 is formed in the flow plate 250 for purposes of routing the leakage to the opening 260. As depicted in FIG. 9 of the other opposite side, or surface 252 of the flow plate 250, the opening 260 is in fluid communication with the anode exhaust opening because the openings 58 and 260 are located inside a seal 100.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method usable with an electrochemical cell, comprising:
   forming a sealed region on a flow plate to contain a reactant flow of the cell, the flow plate including an upper surface and a lower surface, the upper surface being one side of the flow plate and the lower surface being an opposing side of the flow plate, the sealed region including inner seals that surround each of a fuel inlet and a fuel outlet and an active area of the electrochemical cell, and a secondary seal that surrounds the inner seals;
   forming an opening located between an interior edge of the secondary seal and an exterior edge of at least one of the inner seals, the opening extending from the upper surface to the lower surface in the flow plate, the opening and the fuel outlet being surrounded by a third seal at the lower surface; and
   communicating leakage from the inner seal at the upper surface through the opening to the lower surface, the leakage contained by the third seal on the lower surface and communicated to the fuel outlet.

2. The method of claim 1, further comprising:
   forming the exhaust flow from the reactant flow.

3. The method of claim 1, further comprising:
   forming a channel in the flow plate to route the leakage to the opening.

4. The method of claim 1, wherein the sealed region comprises flow channels to communicate the reactant flow to a membrane of the electrochemical cell.

5. The method of claim 1, wherein the sealed region comprises an input plenum of a flow plate stack.

6. The method of claim 1, further comprising:
   isolating the leakage from another reactant flow communicated through an adjacent flow plate of the electrochemical cell.

7. The method of claim 1, wherein the electrochemical cell comprises at least one of the following: a fuel cell, an electrolysis cell and an electrochemical pump cell.

* * * * *